United States Patent [19]

Campo et al.

[11] 4,144,618
[45] Mar. 20, 1979

[54] MATERIAL CONVERGER

[75] Inventors: Edgar A. Campo, Circleville; Robert B. Lewis, Newark, both of Del.

[73] Assignee: E. I. Du Pont de Nemours and Company, Wilmington, Del.

[21] Appl. No.: 808,994

[22] Filed: Jun. 22, 1977

[51] Int. Cl.² ............ D04H 11/00; B65H 17/32
[52] U.S. Cl. .................... 19/161.1; 226/7; 302/31
[58] Field of Search ........... 302/2 R, 29, 30, 31, 302/66; 226/7, 97; 34/10, 23, 57 R, 156; 28/271; 19/155, 161.1

[56] References Cited

U.S. PATENT DOCUMENTS

| | | | |
|---|---|---|---|
| 2,172,153 | 9/1939 | McClure | 19/155 |
| 3,085,346 | 4/1963 | Allander et al. | 34/10 |
| 3,231,165 | 1/1966 | Wallin et al. | 226/97 |
| 3,272,415 | 9/1966 | Wallin | 226/97 |
| 3,304,619 | 2/1967 | Futer | 302/31 X |
| 3,350,140 | 10/1967 | Strydom | 302/31 |
| 3,385,490 | 5/1968 | Malmgren et al. | 226/97 X |
| 3,405,627 | 10/1968 | Day et al. | 134/64 R |
| 3,918,706 | 11/1975 | Craft | 302/31 X |
| 3,999,696 | 12/1976 | Reba et al. | 226/7 |

FOREIGN PATENT DOCUMENTS 674395 6/1952 United Kingdom ............ 302/29

OTHER PUBLICATIONS

Plastics Design & Processing, Jun. 1975, pp. 23-24.

Primary Examiner—Robert B. Reeves
Assistant Examiner—James L. Rowland

[57] ABSTRACT

A material transporting device wherein material is pneumatically moved along a louvered surface and converged to exit from the device in a narrowed pattern. Use of the device is particularly directed to rapid handling of scrap web material.

3 Claims, 6 Drawing Figures

MATERIAL CONVERGER

In manufacturing and handling webs of flexible material, simple and rapid removal of scrap is very important to efficient operation. In fact, the rate of manufacture or handling of wide webs of film material is often controlled by the ease with which scrap can be removed in case of a break in the web. Such removal, in the case of film web handling, includes a collapse or convergence of the web into a narrower form which will be hereinafter characterized as a rope of material. This invention, thus, relates to roping webs of material and to devices for performing the roping.

Pneumatic transport of webs, parts of webs, or small articles has been previously disclosed.

U.S. Pat. No. 3,070,901, for example, discloses that webs can be guided along a certain path by means of a plurality of individual blower devices, some directing air transverse to the direction of travel. Louvers disclosed in that patent extend across the device and there is no disclosure of web material convergence.

U.S. Pat. No. 3,705,676 discloses a conveyor which utilizes widely spaced air nozzles extending across an otherwise closed plenum chamber. The device is disclosed to be useful for removing web trim and for threading paper ribbon to start a paper machine. There is no disclosure of wide web transport or material convergence.

U.S. Pat. No. 2,848,820 pertains to a web converging device utilizing force from a gaseous medium. The device includes ducts for the gaseous medium having apposing vented faces joining a channel through which a web is conveyed. Louvers are not specifically disclosed and there is no hint of web convergence.

U.S. Pat. No. 3,180,688 pertains to a conveyor with an air feed plenum having both perforations and slits, to provide lift and propulsion, respectively, to materials transported in the conveyor. The conveyor is walled with an open top. There is no web convergence.

U.S. Pat. No. 3,181,916 pertains to a conveyance for small articles and includes an air plenum with one louvered surface. The louvered surface is walled with an open top and serves as the floor for article conveyance. There is no web material conveyance and no hint that web, if conveyed, could be converged.

U.S. Pat. No. 3,999,806 describes an air-driven conveyor for individual parts or articles wherein there are integral Y-shaped spur sections in the conveyor. The conveyor includes a deck with an underlying plenum section and holes in the deck, of certain configuration. The deck, in straight sections of the conveyor, includes a combination of lifting holes and propulsion slots and the spur sections have only propulsion slots. There is no mention of web transport or of convergence of materials conveyed.

According to the present invention there is provided a material converger comprising an air-feed plenum having an inlet end and an outlet end, a surface on the plenum decreasing in width from the inlet end to the outlet end, a multitude of slots with louvered openings in the surface, said louvered openings directed toward the outlet end. There is also provided a web material waste handling apparatus comprising a wide web delivery means operatively engaged with a material converger to receive and collapse wide web material, the converger, in turn, operatively engaged with a comminuting means to receive collapsed web material. A process is provided for converging a moving web of flexible material comprising applying longitudinal pneumatic force to a wide web of the material to hold the web under tension; applying balanced transverse forces toward the center of the web under tension over a predetermined length of the web to converge the wide web into a roped structure; moving the web in the direction of the tension to continually apply longitudinal and transverse forces to the moving web; whereby the wide web is continually converged to a roped structure.

Embodiments of the invention are illustrated in the accompanying drawings wherein.

Figure 1:
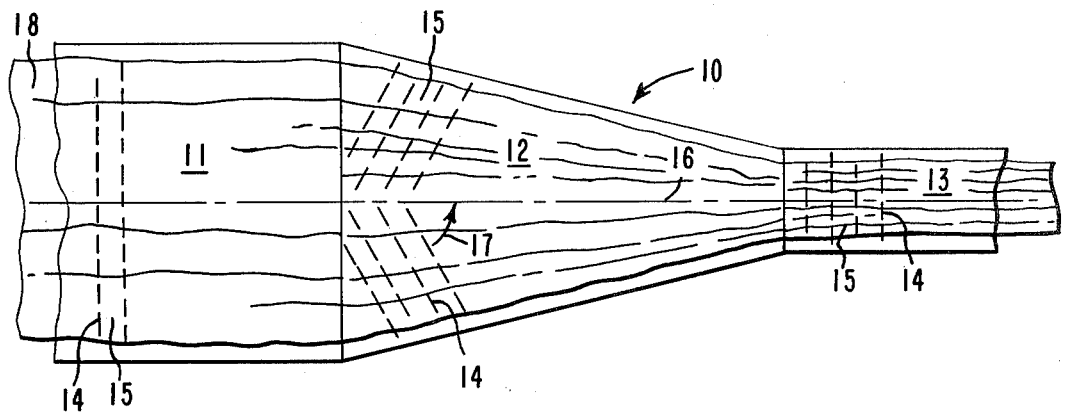
FIG. 1 is a top plan view of a material converger of this invention.

Referring to FIG. 1, material converger 10 includes an inlet conveyor unit 11, a converger unit 12, and an outlet conveyor unit 13. Each unit includes slots 14 with louvered openings cut into surface 15 and arrayed at angles of 90 degrees or less with the direction of material transport. In the conveyor units 11 and 13, the slots 14 with louvered openings are cut generally perpendicular to the unit edges and perpendicular to the direction of material transport. In the converger unit 12, the slots 14 can be cut either perpendicular to or at an acute angle with the intended direction of material transport. Using the center line 16 of the converger unit as a reference line, the slots 14 can be cut at an angle 17 of from about 30 to 90 degrees with angles of from about 40 to 60 being preferred for material convergers which utilize slots cut at acute angles. Slots 14 in converger unit 12 need not be perpendicular to the unit edges and slots cut at different angles can be used in a single unit. Web 19, shown to be transparent, is delivered to converger 10 from a wide web delivery means, not shown. In operation, the web continuously traverses inlet conveyor unit 11 in flat form, converger unit 12 under collapsing forces to yield a rope, and outlet conveyor unit 13 in roped form. In roped form, web 18 can be easily handled such as in a web material waste handling apparatus, the roped structure can be introduced directly into a comminuting means, not shown.

Figure 2:
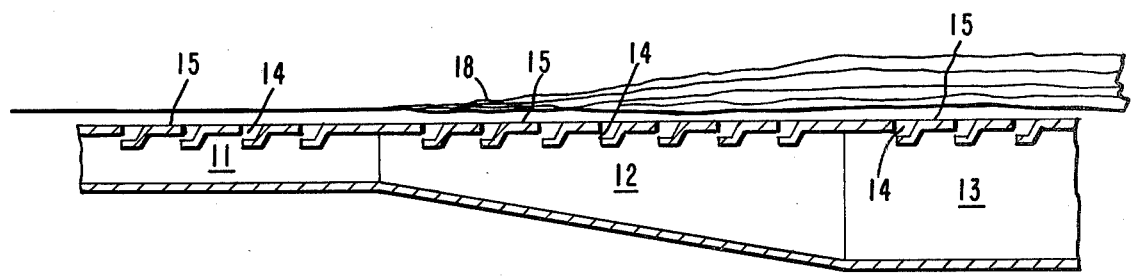
FIG. 2 is a cross-sectional view of a material converger of this invention.

Referring to FIG. 2, material converger 10, including inlet conveyor unit 11, converger unit 12, and outlet conveyor unit 13, is represented in a cross-sectional side view. In these Figures, slots 14 in surface 15 are represented in an oversized manner to indicate the direction of louver openings. The body of inlet conveyor unit 11 is an air feed plenum and, under operational air pressure, air is forced through the slots 14. In the same way, air is forced through the slots 14 in the converger unit 12 and the outlet conveyor unit 13. Air, thus moving through slots 14 provide longitudinal pneumatic forces to hold web 18 under tension; and, in the case of slots 14 cut at an angle, the air also provides transverse forces which, when balanced on each side of a center line on surface 15, converge and collapse web 18. Increase in depth of the plenum with decreasing width can be used to aid in maintaining a balanced air flow through the material converger. The width of surface 15 in conveyor units is constant from end to end, and in converger units decreases in the direction of material transport.

Figure 3:
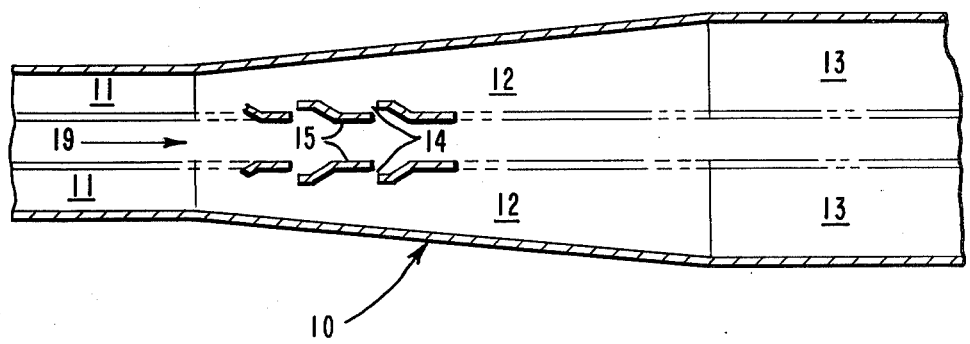
FIG. 3 is a cross-sectional view of a material converger of this invention having two air-feed plenums.

FIG. 3 represents a cross-sectional view of a material converger 10 with two air feed plenums. Individual elements of the converger correspond to elements previously identified in FIG. 2. The material converger 10 of FIG. 3 includes two single plenum convergers positioned surface-to-surface (15—15) and spaced apart to leave chanel 19 through which web material is conducted and converged. Channel 19 can be made to increase in depth with decreasing width to accommodate transport of web material as the web is converged into a roped form.

Figure 4:
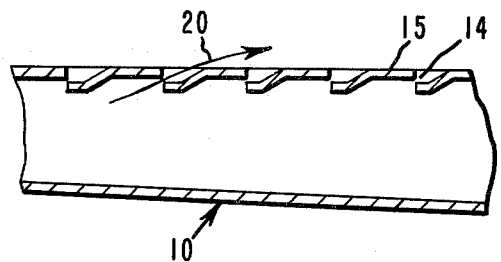
FIG. 4 is a longitudinal cross-sectional view of a louvered portion of a material converger of this invention.

FIG. 4 represents a cross-sectional view cut through slots 14 in a portion of surface 15 of a converger unit 12. Arrow 20 indicates the direction of air flow and consequent direction of material transport under operational air pressure.

Figure 5:
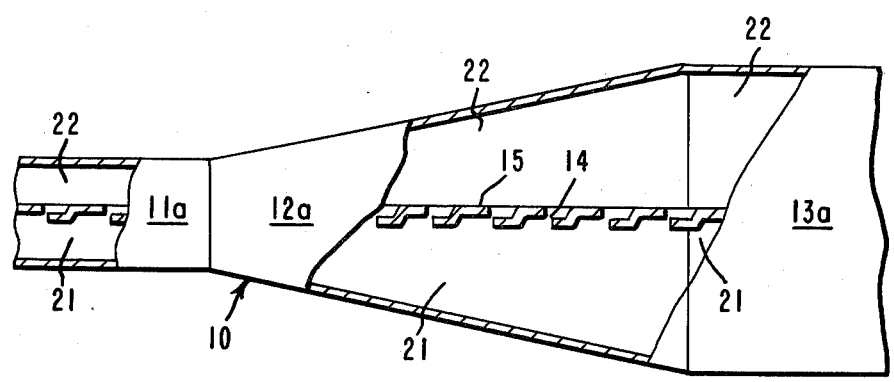
FIG. 5 is a cut-away section of the side of a material converger having both, an air feed plenum and a material feed plenum.

FIG. 5 represents a partially cut away side view of a material converger 10 including inlet conveyor unit 11a, converger unit 12a, and outlet conveyor unit 13a. The bodies of the conveyor units 11a and 13a and the converger unit 12a in this FIG. 5 includes air feed plenum 21 with material feed plenum 22 mounted thereon. Material feed plenum 22 is shown to have increased depth with decreased width to facilitate handling of wide web material in roped form. Surface 15 forms a common wall between air feed plenum 21 and material feed plenum 22.

Figure 6:
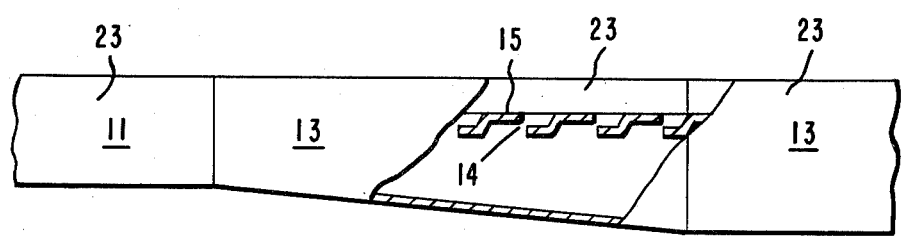
FIG. 6 is a cut-away section of the side of a material converger having an air feed plenum and material guides.

FIG. 6 represents a partially cut away side view of a material converger including inlet and outlet conveyor units 11 and 13, converger unit 12, surface 15 and slots 14, as previously described. The material converger of this Figure also includes material guides 23 which are walls extending upward from and defining the lateral edges of the surface 15.

The material guides serve a dual purpose. First, the guides prevent web material from running off of the converger during operation, especially during start-up while threading a web through a converger device. Second, the guides aid in converging, collapsing, and roping web material moving through the conveyor by providing transverse forces toward the center of the web material. The aid provided by material guides in collapsing web material is especially important in operation of converger units having slots perpendicular to the direction of material transport and in handling web materials having a stiffness too great for ready collapse by air forces alone.

Convergers having slots cut perpendicular to the direction of material transport are constructed with material guides along the converging sides of the unit. Convergence or roping of a moving web is accomplished by contact of the web with the material guides. In such convergers, web roping is dependent upon the combination of transporting force provided by air passing the louvers and converging force provided by physical contact between the web and the material guides.

Convergers having angled slots can also be used with material guides along the converging sides of the unit. Such convergers are ideally suited for roping webs of film having a stiffness such that the material guides provide converging forces by contact between the film and the material guides.

Convergers having slots cut at an angle with the direction of material transport can be used without material guides, if desired. In such conveyors, roping of a moving web is accomplished by angled forces from the louver openings.

Material guides can be straight or curved, perpendicular or angled with the louvered surface. The guides can be walls of any effective height depending on the requirement of a particular use; such heights ranging from a mere rib tracing the pattern of the louvers to curved walls angled upward and together to yield a closed material feed plenum. Material guides can be formed from louvered surfaces angled upward and equipped as air plenums such that the material guides also operate as conveying surfaces.

In operation, a gas pressure is provided in the plenum of the material converger by means of fans or the like. For reasons of economy, air is the gas most often used although any other suitable gas or combination of gases would be effective. Additives can be combined with the gas to accomplish some treatment and the gas can be heated or cooled to alter temperatures or to dry transported material. The gas pressure must be sufficient to move gas through the plenum at a velocity greater than the desired rate of web transport.

Gas to exert the desired pressure can be introduced at any location or locations in the air feed plenum and need not necessarily be supplied at the inlet end of the material converger. It is only required that the gas be supplied such that gas flow through the louvers is sufficient to propel web material along the louvered surface.

Web transport in paper manufacture may be greater than about 900 meters per minute and, in polymer film manufacture or rewinding, may be greater than about 600 meters per minute. The material converger of this invention can successfully rope webs at such rate and it is also useful in roping web transported slowly, for instance, as slowly as about 15 meters per minute. Web material to be transported and roped is introduced at the inlet end of the device whether the device commences with a conveyor unit or a converger unit.

The material converger of this invention can be made to be self-starting. Such self-starting is an important feature where nearly instantaneous web scrap removal is necessary in high speed material handling processes. To improve the self-starting capability of the material converger for a variety of web thicknesses and material kinds, it has been found that the inlet end of the device should include at least two air feed plenums having surfaces in juxtaposed, spaced-apart, relation, with the louvered openings directed in concert. It has also been found helpful to fit the outlet end of the device with a material feed plenum or an air feed plenum to assist in continuous operation of the device through gaps in material supply caused by breaks in the web.

Roping and transport of web materials can be conducted with the surface of the material converger in any attitude — vertical, horizontal, or any intermediate position — and in a flat or curvilinear shape. The material converger of this invention can be effectively operated with a surface which exhibits curve either the right or the left on the horizontal plane and curve of either inside or outside radius on the vertical plane.

Louvers in the surface of air feed plenums are formed from slots cut in the surface and opened in the direction of intended material travel. Louvers direct the gas nearly flat along the surface. The louver openings are preferably below and are nearly perpendicular with the surface. Arrays of louvers can be in any pattern and can have any length and spacing within the following general limits: The louvers are less than 25 centimeters and preferably from 2 to 15 centimeters long. The length of the louvers is less than one-fourth the width of the surface. Each louver should have more than one neighboring louver at least one-fourth louver length but less than three louver lengths away.

Louver length and spacing is important to maintain a stable and rapid movement of web material. Louvers which are too long or which are spaced too closely permit an excessive flow of gas from the plenum resulting in excessively reduced gas pressure farther along the plenum. Such excessively reduced gas pressure provides inadequate force for continued collapse and transport of the material. Louvers which are too short or which are spaced too far apart prevent gas flow adequate to provide material collapse and transport.

As a general rule, louvers at the inlet end of the device should be relatively closer together than louvers at the outlet end. Such progressively greater spacing between louvers is believed to aid in balancing gas flow through the device.

Web material which can be collapsed and transported by the device of this invention includes fibrous material such as paper, metals such as aluminum foil, synthetic polymeric material such as polymer film and spunbonded polymer webs, and the like. The device is particularly suited to collapsing and transporting webs of material having indefinite length. The material can be thick or thin and must only exhibit adequate flexibility for collapse if it is to be transported through the material converger of this invention.

As specific examples of the present invention, material convergers having angled slots and material guides can be used to rope webs of polyethylene terephthalate film as thick as about 125 microns (5 mils). Polyethylene terephthalate film as thick as about 50 microns (2 mils) can be roped and transported using a material converger having angled slots either with or without material guides or using a material converger having slots perpendicular to material transport and fitted with material guides. A preferred slot configuration involves slots about 5 centimeters long spaced 5 centimeters apart in the direction of web travel with slot ends 5 centimeters apart in the transverse direction. Louvers formed from the slots in this configuration can have an opening about 0.15 centimeters wide.

The degree of collapse or roping, expressed as a ratio of initial web width to distance across the rope is from less than two to greater than seven. Other than as a matter of practicality, there do not appear to be actual limits to this ratio. With very wide webs of material collapsed over long distances or at sharp angles higher degrees of roping can be obtained. Angles of web convergence as great as 80 degrees have been demonstrated. Webs as wide as more than six meters can be easily roped to less than two meters while being transported at more than 500 meters per minute. In transporting scrap web material, it is generally most convenient to direct the scrap web directly into a shredding or chipping device to comminute the scrap into an efficient form for recycling processes.

What is claimed is:

1. A process for converging a moving web of flexible material comprising
    applying longitudinal pneumatic force to a wide web of the material to hold the web under tension;
    applying balanced transverse pneumatic forces toward the center of the web under tension over a predetermined length of the web to converge the wide web into a roped structure;
    moving the web in the direction of the tension to continually apply longitudinal and transverse forces to the moving web;
    whereby the wide web is continually converged to a roped structure.

2. A process for converging a moving web of flexible material comprising
    delivering a web to be converged to a material converger having an air feed plenum with an inlet end, an outlet end, a surface on the plenum decreasing in width from the inlet end to the outlet end, and a multitude of louvers in the surface directed toward the outlet end;
    providing gas pressure to the air feed plenum sufficient to move gas through the plenum at a velocity greater than the web is moving to exert a longitudinal pneumatic force to the web to hold the web under tension;
    applying balanced transverse forces toward the center of the web under tension over a predetermined length of the web to converge the web into a roped structure;
    moving the web over the material converger in the direction of the tension to continually apply longitudinal and transverse forces to the moving web;
    whereby the web is continually converged to a roped structure.

3. The process of claim 2 wherein transverse forces are pneumatic.

* * * * *

UNITED STATES PATENT OFFICE
CERTIFICATE OF CORRECTION

PATENT NO. : 4,144,618
DATED : March 20, 1979
INVENTOR(S) : EDGAR ALFREDO CAMPO and ROBERT BEE LEWIS It is certified that error appears in the above-identified patent and that said Letters Patent are hereby corrected as shown below:

On title cover page, second line below Inventors, after "Newark," delete "both of".

On title cover page, on line of Inventors, after "Circleville", insert -- Ohio --.

Col. 2, line 44, "19" should read -- 18 --.

Col. 3, line 13, "chanel" should read -- channel --.

Col. 3, line 44, "a" should read -- the --.

Signed and Sealed this

Eighteenth Day of September 1979

[SEAL]

Attest:

LUTRELLE F. PARKER
Attesting Officer   Acting Commissioner of Patents and Trademarks